US007774535B2

(12) United States Patent
Nakamura

(10) Patent No.: US 7,774,535 B2
(45) Date of Patent: Aug. 10, 2010

(54) MEMORY SYSTEM AND MEMORY DEVICE

(75) Inventor: Nobutaka Nakamura, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/428,370

(22) Filed: Apr. 22, 2009

(65) Prior Publication Data
US 2009/0319748 A1 Dec. 24, 2009

(30) Foreign Application Priority Data
Jun. 19, 2008 (JP) .............................. 2008-160692

(51) Int. Cl.
G06F 12/00 (2006.01)
(52) U.S. Cl. ........................ 711/5; 711/117; 711/170; 365/51
(58) Field of Classification Search ................ 711/5
See application file for complete search history.

(56) References Cited

U.S. PATENT DOCUMENTS

| 7,102,905 | B2 | 9/2006 | Funaba et al. | |
| 7,158,536 | B2 | 1/2007 | Ching et al. | |
| 7,526,597 | B2* | 4/2009 | Perego et al. | 711/5 |
| 2005/0238052 | A1 | 10/2005 | Yamazaki | |

FOREIGN PATENT DOCUMENTS

| JP | 2001-014222 | 1/2001 |
| JP | 2002-007308 | 1/2002 |
| JP | 2005-202496 | 7/2005 |
| JP | 2007-034740 | 2/2007 |
| JP | 2008-033657 | 2/2008 |
| JP | 2008-052518 | 3/2008 |
| WO | WO 2004/010315 | 1/2004 |
| WO | WO 2007/038225 | 4/2007 |

OTHER PUBLICATIONS

"Dynamic Point-to-Point Technology", [online], Rambus Inc., http://www.rambus.com/us/patents/innovations/detail/dpp.html.

* cited by examiner

Primary Examiner—Christian P Chace
Assistant Examiner—Matthew Bradley
(74) Attorney, Agent, or Firm—Patterson & Sheridan, LLP

(57) ABSTRACT

According to one embodiment, a first memory device is configured to receive write data from a controller and transmit read data to the controller via a first data pin included in the first memory device. The second memory device is configured to receive write data from the controller and transmit read data to the controller via a second data pin included in the second memory device. A redelivery module within the first memory device is configured to receive an address and a command output from the controller via a predetermined signal line, and output the address and the command to the second memory device via remaining first data pin.

9 Claims, 7 Drawing Sheets

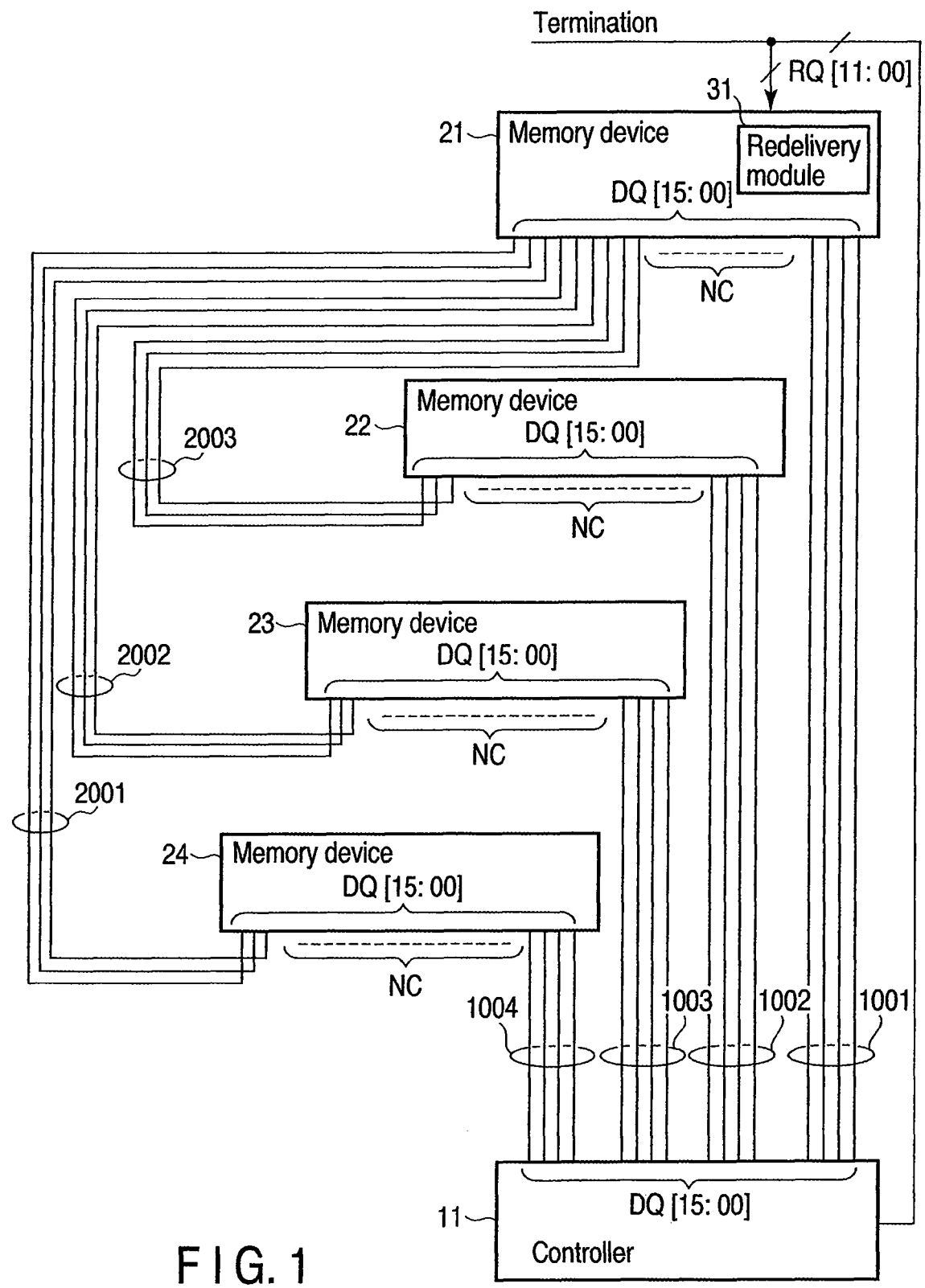
F I G. 1

MEMORY SYSTEM AND MEMORY DEVICE

CROSS-REFERENCE TO RELATED APPLICATIONS

This application is based upon and claims the benefit of priority from Japanese Patent Application No. 2008-160692, filed Jun. 19, 2008, the entire contents of which are incorporated herein by reference.

BACKGROUND

1. Field

One embodiment of the invention relates generally to a memory system and a memory device for use in various kinds of electronic apparatuses, and more particularly to a memory system and a memory device which are so improved as to flexibly adaptable to the expansion in memory size.

2. Description of the Related Art

In general, in a memory system which is composed of memory devices such as DDR SDRAMs, a bus (data bus, command bus, address bus) is shared by a plurality of memory devices. A chip select signal is allocated to a unit of each individual memory device or to a unit of memory devices. A controller (memory controller) selectively asserts the chip select signal, thereby being able to select one device or one set of devices.

In the memory system in which the bus is shared by a plurality of memory devices, however, as the number of memory devices which are connected to the bus becomes greater, the load on the bus increases. Thus, if many memory devices are connected to the bus in order to expand the memory size of the memory system, the signal quality of, e.g. a data signal, an address signal and a control signal degrades, and the operational reliability may possibly deteriorate.

Recently, there has been developed a memory device which supports point-to-point data interconnection, thereby to realize a high data transfer speed (see, e.g. "Dynamic Point-to-Point Technology", available online at Rambus Inc.

In addition, an XDR™ DRAM is known as a memory device which supports point-to-point data interconnection. The XDR™ DRAM includes a plurality of data pins which are point-to-point connectable to a controller. The XDR™ DRAM also includes a function called "Dynamic Width Control", and only some of the plural data pins can be used for data transfer with the controller. In this case, the other data pins remain unused.

However, in the XDR memory system, although data lines are independent in association with each individual memory device, a control signal line for transferring an address signal and a command signal are shared between a plurality of memories. Thus, if a memory device is additionally provided in order to expand the memory size, it is possible that the signal quality of the address signal or command signal deteriorates.

It is necessary, therefore, to realize a novel function which is flexibly adaptable to the expansion of memory size, without causing degradation in signal quality.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing a structure example of a memory system according to an embodiment of the invention;

DETAILED DESCRIPTION

Figure 2:
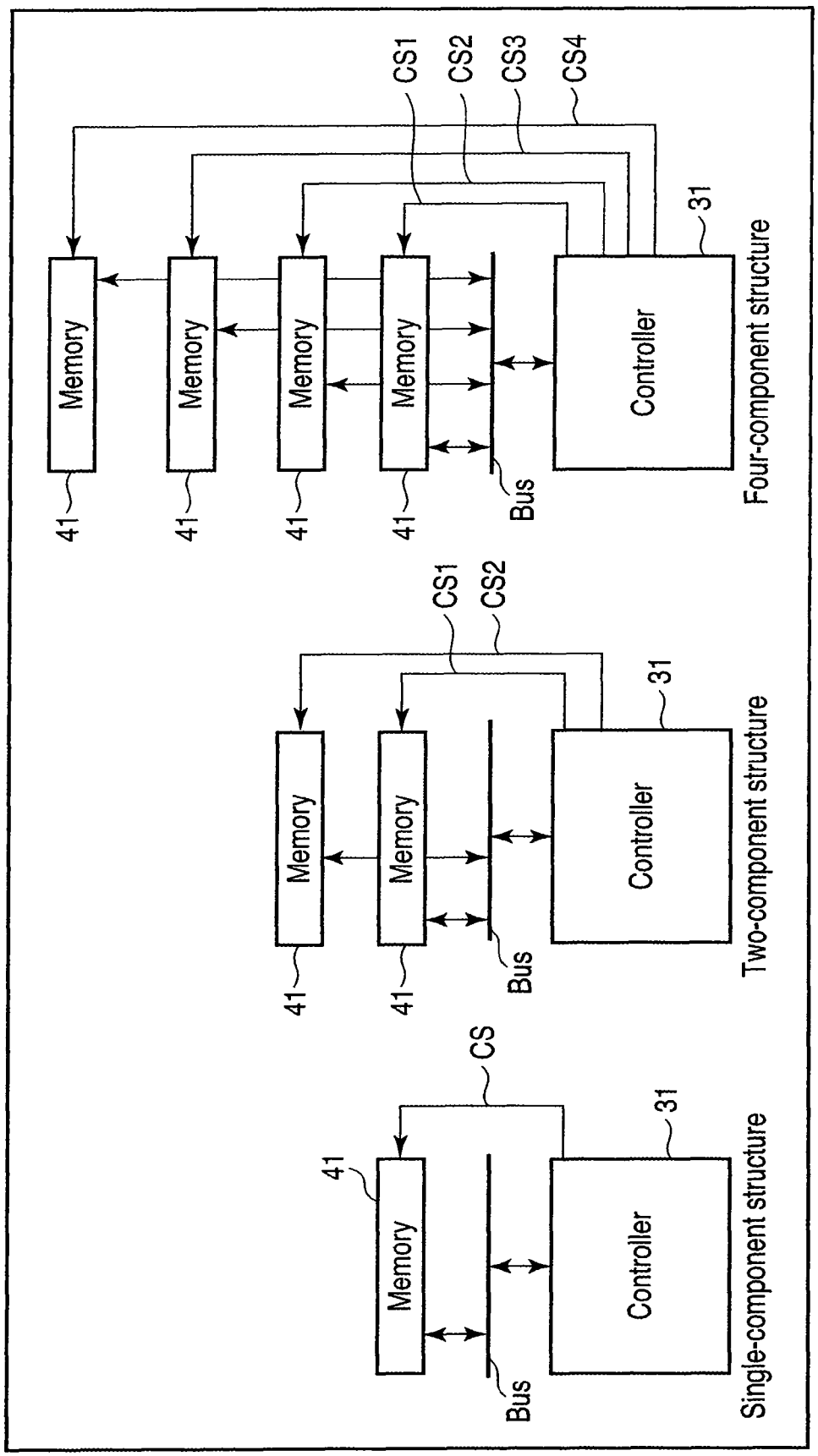
FIG. 2 is an exemplary block diagram for describing a general memory size expansion method in a memory system using a memory device such as a DDR SDRAM.

Various embodiments according to the invention will be described hereinafter with reference to the accompanying drawings. In general, according to one embodiment of the invention, there is provided a memory system comprising: a first memory device configured to receive write data from a controller and transmit read data to the controller via a first data pin included in the first memory device; a second memory device configured to receive write data from the controller and transmit read data to the controller via a second data pin included in the second memory device; and a redelivery module within the first memory device, configured to receive an address and a command output from the controller via a predetermined signal line, and output the address and the command to the second memory device via remaining first data pin.

FIG. 1 shows the structure of a memory system according to an embodiment of the invention. This memory system is mounted and used in various electronic apparatuses such as personal computers, servers, TVs and game machines. This memory system is composed of a controller (memory controller) 11 and a plurality of memory devices. FIG. 1 shows, by way of example, the case in which four memory devices 21, 22, 23 and 24 are mounted in the memory system.

Each of the memory devices 21, 22, 23 and 24 has a plurality of data pins. In each of the memory devices 21, 22, 23 and 24, some of the plural data pins are used for data transfer with the controller 11. Specifically, some (at least one) of the data pins are used for receiving write data from the controller 11 and transmitting read data to the controller 11. Normally, the other data pins are not used. However, in the present embodiment, the other data pins are used for redelivering addresses and commands, which are received from the controller 11, from the memory device 21 to the other memory devices 22, 23 and 24.

Next, the structure of each of the memory devices 21, 22, 23 and 24 is described.

Each of the memory devices 21, 22, 23 and 24 is composed of a high-speed memory device, such as an XDR™ DRAM, which includes a plurality of data pins which are point-to-point connectable to the controller 11. In this description, the features of the high-speed memory device are explained by taking the XDR™ DRAM as an example.

In the XDR™ DRAM, the data transfer speed per data pin (differential pair) is very high. The data transfer speed is 3.2, 4.0 or 4.8 GHz. The data transfer speed of 6.4 GHz is planned in the future. The frequency of a clock signal (differential pair of CFM and CFMN), which is supplied from the controller to each XDR™ DRAM, is 400 MHz, 500 MHz, 600 MHz or 800 MHz. The data transfer speed corresponds to a rate that is eight times higher than the frequency of the clock signal.

The connection between the controller and the data pin of each XDR™ DRAM is peer-to-peer connection. The voltage amplitude for data transfer is very small (200 mV). In addition, a mechanism (FlexPhase) for automatically executing fine phase adjustment is assembled in the XDR™ system.

The XDR™ DRAM has a function called "Dynamic Width Control", and the same memory device supports ×16 mode bus width (16 bits), ×8 mode bus width (8 bits), ×4 mode bus width (4 bits), and ×2 mode bus width (2 bits). In the "Dynamic Width Control" standard, ×1 mode bus width (1 bit) is also defined. A request packet is used in order to transmit a command and an address from the controller to each XDR™ DRAM. A control signal line for carrying the request packet (command and address) includes, for example, 12 single-end control signal lines (RQ[11:00]). The request packet is transmitted in synchronization with both edges (rising edge and falling edge) of the clock signal (differential pair of CFM and CFMN), and thereby information of 24 bits per time slot is transmitted.

The XDR™ DRAM supports register access using serial communication. The controller outputs a serial clock SCK, a command CMD for register access, and a reset signal RST. Each of a serial clock SCK line, a command CMD line and a reset signal RST line is shared by all XDR™ DRAM.

An XDR™ DRAM receives serial data input SDI from a neighboring XDR™ DRAM and outputs its own serial data output SDO to an opposite-side neighboring XDR™ DRAM. Specifically, as regards SDI and SDO, the XDR™ DRAMs are daisy-chain connected. Serial data output SDO from the last XDR™ DRAM is output to the controller as SRD. Read/write of the register can individually be executed with respect to each XDR™ DRAM. In the case of write, write can be executed in all XDR™ DRAMs. Register access is executed at a relatively low speed with the serial clock SCK of several tens of megahertz or less.

Each of the memory devices 21, 22, 23 and 24 shown in FIG. 1 includes a plurality of data pins, for instance, 16 data pins (DQ[15:00]). Each data pin includes, for example, a pair of pins (differential pair) for two-way transmission of a differential signal. Thus, actually, each of the memory devices 21, 22, 23 and 24 includes 16 pairs of data pins (DQ[15:00]).

Each of the memory devices 21, 22, 23 and 24 executes data transfer with the controller 11 by using some data pins (some differential pairs) in DQ[15:00].

FIG. 1 shows, by way of example, the case in which each of the memory devices 21, 22, 23 and 24 executes data transmission with the controller 11 with a bus width of the ×4 mode. In this case, in the memory device 21, four data pins (four differential pairs) in the DQ[15:00] are peer-to-peer connected to the controller 11 via four differential signal line pairs 1001. The memory device 21 executes reception of write data from the controller 11 and transmission of read data to the controller 11 via four data pins (four differential pairs).

Also in each of the memory devices 22, 23 and 24, four data pins (four differential pairs) in the DQ[15:00] are peer-to-peer connected to the controller 11. Specifically, the four data pins (four differential pairs) of the memory device 22 are peer-to-peer connected to the controller 11 via four differential signal line pairs 1002. Similarly, the four data pins (four differential pairs) of the memory device 23 are peer-to-peer connected to the controller 11 via four differential signal line pairs 1003, and the four data pins (four differential pairs) of the memory device 24 are peer-to-peer connected to the controller 11 via four differential signal line pairs 1004. Each of the memory devices 22, 23 and 24 executes reception of write data from the controller 11 and transmission of read data to the controller 11 via the four data pins (four differential pairs).

Normally, all memory devices 21, 22, 23 and 24 are connected to the control bus which comprises 12 control signal lines (RQ[11:00]). In the present embodiment, however, only the memory device 21 is connected to the control signal lines (RQ[11:00]). This aims at preventing an increase of the load on the control signal lines (RQ[11:00]) even if many memory devices are additionally provided in order to expand the memory size of the memory system of the present embodiment.

The memory device 21 includes a redelivery module 31. The redelivery module 31 redelivers the address and command, which are received via the control signal lines (RQ[11:00]), to the respective memory devices 22, 23 and 24. In this case, the redelivery module 31 outputs the address and command to each of the memory devices 22, 23 and 24 by using unused data pins (unused differential pairs) of the DQ[15:00] provided in the memory device 21. At least one unused data pin (at least one unused differential pair) is used for redelivery of the address and command to each of the memory devices 22, 23 and 24. In the example shown in FIG. 1, three data pins (three differential pairs) are used for redelivery of the address and command to each of the memory devices 22, 23 and 24.

Three data pins (three differential pairs) of the memory device 21 are peer-to-peer connected to three data pins (three differential pairs) of the memory device 24 via three differential signal line pairs 2001. The three data pins (three differential pairs) of the memory device 24, which are connected to the three differential signal line pairs 2001, are data pins which are not used for data transfer with the controller 11. The memory device 24 handles the request packet (address and data), which is received via the three data pins (three differential pairs), as a request packet which is sent from the controller 11 via the 12 control signal lines (RQ[11:00]).

Other three data pins (three differential pairs) of the memory device 21 are peer-to-peer connected to three data pins (three differential pairs) of the memory device 23 via three differential signal line pairs 2002. The three data pins (three differential pairs) of the memory device 23, which are connected to the three differential signal line pairs 2002, are data pins which are not used for data transfer with the controller 11. The memory device 23 handles the request packet (address and data), which is received via the three data pins (three differential pairs), as a request packet which is sent from the controller 11 via the 12 control signal lines (RQ[11:00]).

Still other three data pins (three differential pairs) of the memory device 21 are peer-to-peer connected to three data pins (three differential pairs) of the memory device 22 via three differential signal line pairs 2003. The three data pins (three differential pairs) of the memory device 22, which are connected to the three differential signal line pairs 2003, are data pins which are not used for data transfer with the controller 11. The memory device 22 handles the request packet (address and data), which is received via the three data pins (three differential pairs), as a request packet which is sent from the controller 11 via the 12 control signal lines (RQ[11:00]).

As has been described above, the memory device 21 receives the request packet via the 12 signal pins which are connected to the 12 control signal lines (RQ[11:00]), and redelivers the received request packet to each of the memory devices 22, 23 and 24 via some pairs of data pins which are not used for data transfer. Accordingly, even in the case where the number of memory devices is increased, only one device is connected to the 12 control signal lines (RQ[11:00]). Therefore, memory devices can be additionally provided without causing degradation in signal quality of the address signal and the command signal.

(Memory Size Expansion Method)

FIG. 2 shows a general memory size expansion method in a memory system using a memory device such as a DDR SDRAM.

A left-side part of FIG. 2 shows a memory system including a single DDR SDRAM 41. The DDR SDRAM 41 and a controller 31 are connected to a bus (data bus, command bus, address bus). In addition, a chip select signal CS is supplied from the controller 31 to the DDR SDRAM 41.

A central part of FIG. 2 shows a memory system including two DDR SDRAMs 41. The two DDR SDRAMs 41 are connected to the bus. Two chip select signals CS1 and CS2 from the controller 31 are supplied respectively to the two DDR SDRAMs 41.

A right-side part of FIG. 2 shows a memory system including four DDR SDRAMs 41. The four DDR SDRAMs 41 are connected to the bus. Four chip select signals CS1, CS2, CS3 and CS4 from the controller 31 are supplied respectively to the four DDR SDRAMs 41.

Figure 3:
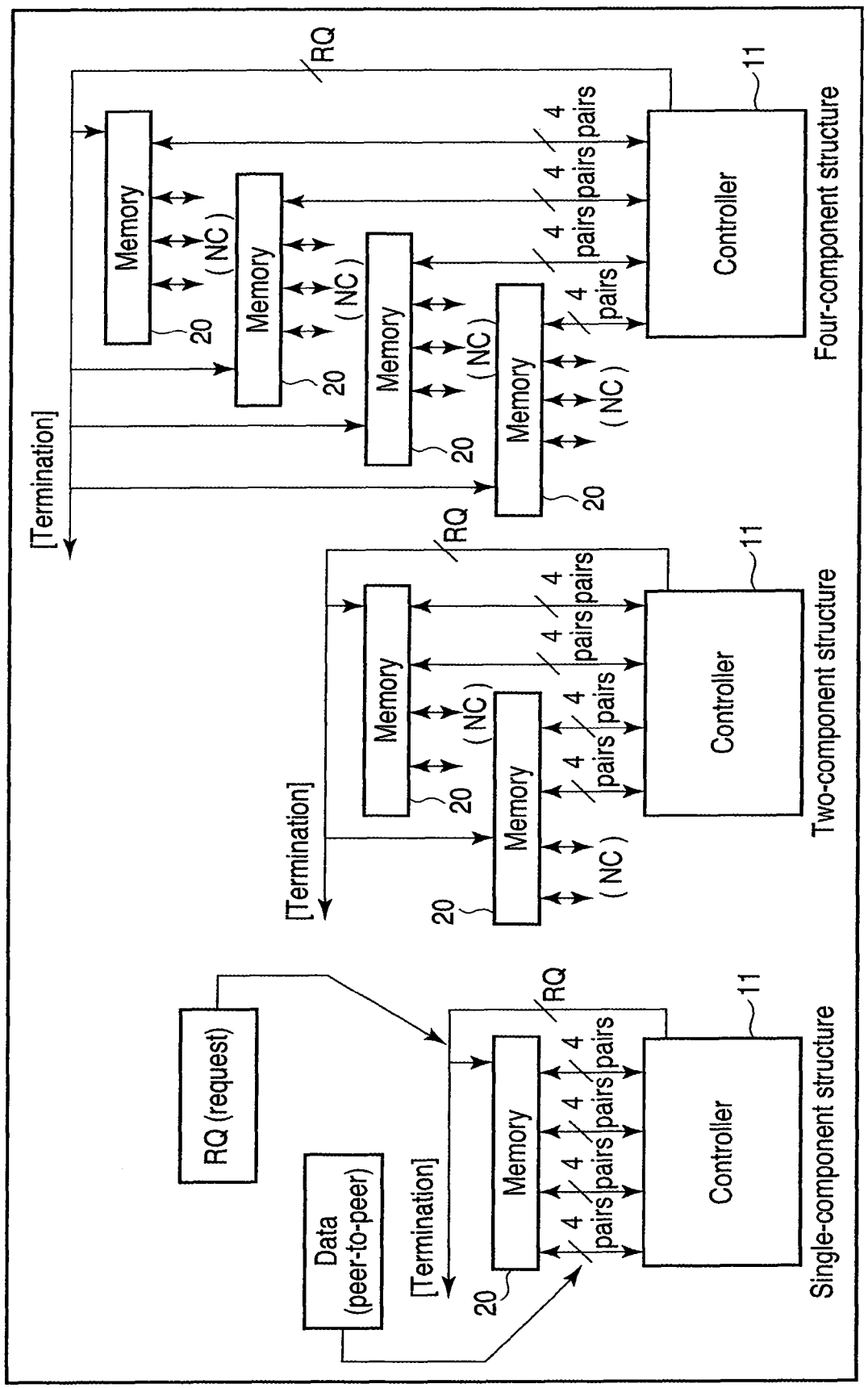
FIG. 3 is an exemplary block diagram for describing a memory size expansion method in a memory system using a memory device such as an XDR™ DRAM.

FIG. 3 illustrates a memory size expansion method in a memory system using a memory device (e.g. XDR™ DRAM) which supports point-to-point data interconnection.

In a memory device such as an XDR™ DRAM having data pins which are peer-to-peer connected to the controller 11, the memory capacity expansion by the bus system, which has been described with reference to FIG. 2, is not applicable. The reason is that since the data transfer speed is very high, only peer-to-peer connection is permitted as connection of data lines between the controller 11 and each memory device 20. In the memory device such as an XDR™ DRAM, the memory capacity can be expanded by using the above-described Dynamic Width Control function. The Dynamic Width Control function is a function for controlling the data transfer width by varying the number of data pins which are used for data transfer.

FIG. 3 assumes the case in which each memory device 20 has a 512M bits structure, and has a 16 bit-width data interface. Specifically, each memory device 20 has 16 pairs of data pins (DQ[15:00]) as an interface for data input/output.

A left-side part of FIG. 3 shows a memory system including a single memory device 20. The total capacity is 64 Mbytes. The memory device 20 is used in the ×16 mode.

A central part of FIG. 3 shows a memory system including two memory devices 20. In the case where the number of pairs of data pins that are included in the controller 11 is 16, each of the two memory devices 20 needs to be used in the ×8 mode (the total is 16 bits). The total capacity of the two memory devices is 128 MBytes. In usual cases, each of the two memory devices 20 is connected to 12 control signal lines (RQ[11:00]). The two memory devices 20 operate at the same time in accordance with the request packet (address, command) which is supplied from the controller 11 via the control signal lines (RQ[11:00]).

A right-side part of FIG. 3 shows a memory system including four memory devices 20. In the case where the number of pairs of data pins that are included in the controller 11 is 16, each of the four memory devices 20 needs to be used in the ×4 mode (the total is 16 bits). The total capacity of the four memory devices is 256 MBytes. In usual cases, each of the four memory devices 20 is connected to 12 control signal lines (RQ[11:00]). The four memory devices 20 operate at the same time in accordance with the request packet (address, command) which is supplied from the controller 11 via the control signal lines (RQ[11:00]).

If each of eight memory devices 20 is used in the ×2 mode, a memory system having a total data width of 16 bits and a total capacity of 512 MBytes is realized. If each of 16 memory devices 20 is used in the ×1 mode, a memory system having a total data width of 16 bits and a total capacity of 1024 MBytes is realized.

Normally, remaining data pins (differential pairs), which are not used for data transfer, are non-connected (NC). In each memory device, 8-pair data pins remain unused in the ×8 mode, 12-pair data pins remain unused in the ×4 mode, 14-pair data pins remain unused in the ×2 mode, and 15-pair data pins remain unused in the ×1 mode.

Figure 4:
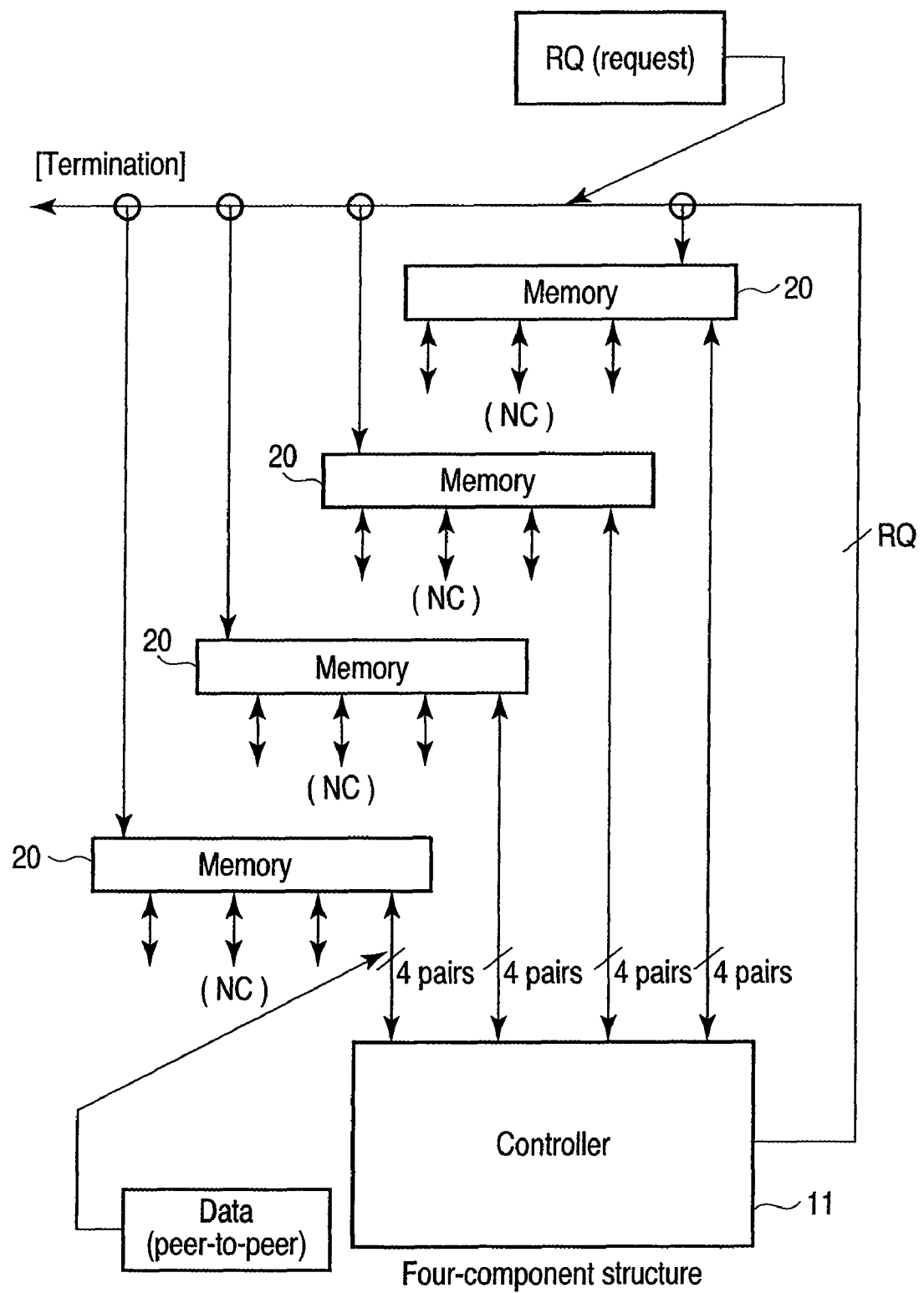
FIG. 4 is an exemplary block diagram for explaining that there is a case in which the signal quality of an RQ (request packet) is difficult to secure, when the expansion method illustrated in FIG. 3 is applied.

FIG. 4 shows that it is difficult to secure the signal quality of the RQ (request packet) in the case where the memory capacity is expanded by using the Dynamic Width Control function.

The request packet RQ from the controller 11 needs to be sent to all memory devices 20. However, in the structure in which all memory device 20 share the 12 control signal lines (RQ[11:00]), if the number of memory devices increases, it becomes difficult to secure the signal quality of the address signal and command signal. FIG. 4 shows the case in which the RQ[11:00] is shared by four memory devices 20. Actually, there may be a case in which the RQ[11:00] is shared by 8 memory devices or 16 memory devices. In such a case, it is more difficult to maintain the quality of the signal that is carried by the RQ[11:00].

On the other hand, as regards the data, careful system design is made to realize high-speed data transfer (e.g., limitation to peer-to-peer connection; differential signal; small amplitude; FlexPhase).

(Redelivery Function)

Figure 5:
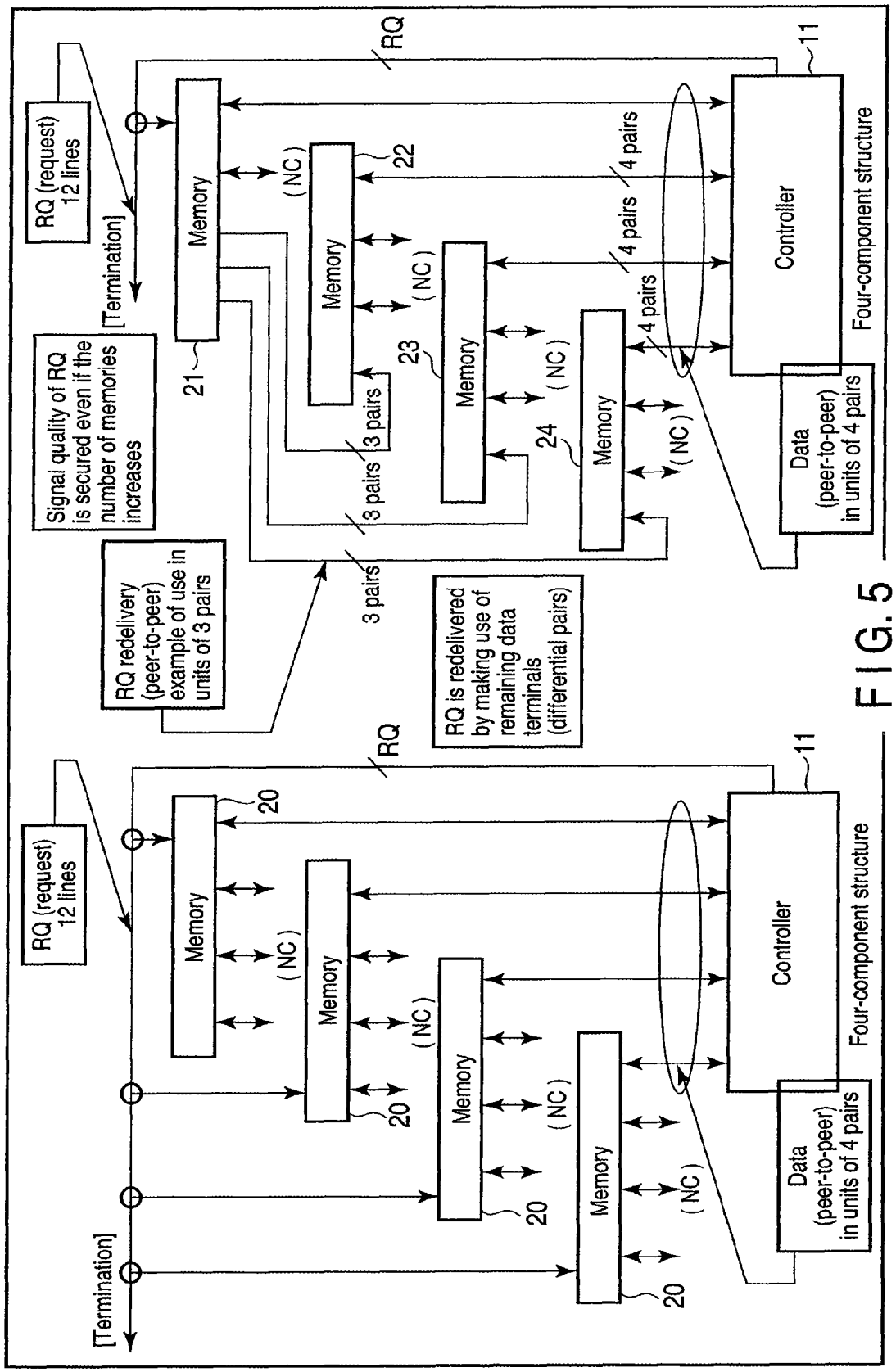
FIG. 5 is an exemplary block diagram for describing a redelivery function of the RQ (request packet) which is used in the memory system according to the embodiment.

A right-side part of FIG. 5 shows the state in which unused remaining data pins (differential) are utilized to share the information of the request packet RQ (address information, command information) between the memory devices in the case of expanding the memory capacity by using the Dynamic Width Control function. A left-side part of FIG. 5 shows the same memory system as shown in FIG. 4 for the purpose of comparison.

For example, in the case where each of four memory devices 21, 22, 23 and 24 is used in the ×4 mode, 12-pair data pins remain unused in each memory device. The RQ[11:0] is connected to the first memory device 21 of the four memory devices 21, 22, 23 and 24. The request packet RQ is redelivered from the first memory device 21 to the other three memory devices 22, 23 and 24.

The data pins, which are used for redelivery of the request packet RQ, is peer-to-peer connected between the memory device 21 and the other memory devices. Three pairs of data pins are used for the redelivery of the request packet RQ from the memory device 21 to each of the memory devices 22, 23 and 24. In the case of a 4.8-GHz memory device, one data pin pair has a data transfer capability of 4.8 Gbps. If three-pair data pins are used, the data transfer capability becomes 14.4 Gbps, which can realize a data transfer rate that is necessary for the packet information of the RQ. Since the memory device, which is connected to the RQ[11:0], is only the first memory device, the signal quality of the RQ can be secured even if the number of memory devices, which are included in the memory system, increases.

Next, a description is given of the function which is provided in each of the memory devices 21, 22, 23 and 24 which are used in the present embodiment.

(Function of RQ Transmission-Side Memory Device)

In the present embodiment, the RQ transmission-side memory device (memory device 21) is provided with, for example, the following functions.

(1) A function of redelivering the request packet, which is received by the signal pin RQ[11:0], by using at least one remaining data pair:

This redelivery function is executed by the above-described redelivery module 31. The redelivery module 31 redelivers the 24-bit request packet, which is received by the signal pin RQ[11:0], to each of the memory devices 22, 23 and 24 by using at least one data pin, which is not used for data transfer with the controller 11.

(2) A timing adjustment function for adjusting a command execution start timing (i.e. delaying the own command execution start timing in accordance with the start timing of the reception-side memory device):

The timing adjustment function is a function of delaying the start timing (command execution start timing) of the memory access operation, which is to be executed by the memory device 21, by a predetermined wait time corresponding to the time that is needed for the redelivery of the request packet (address and command) from the memory device 21 to each of the other memory devices 22, 23 and 24. This timing adjustment function enables all memory devices to start the memory access operation at the same time in accordance with the request packet.

(3) A register for controlling the setting of the functions:

This register prestores control data for controlling the setting (enable/disable; designation of the data pin pair to be used for redelivery; designation of command execution start timing (designation of wait time), etc.) of the various functions (redelivery function, timing adjustment function, etc.). The writing of control data to the register can be executed via a serial interface. The controller 11 or some other microcomputer can write control data to the register via the serial interface.

(4) (Option) A phase adjustment function such as Flex-Phase:

The FlexPhase is a function of adjusting a skew between the data pin of the memory device and the data pin of the controller. Normally, many circuits (for executing the phase auto-adjustment) are mounted on the controller side. In the present embodiment, the memory device 21 uses at least one data pin pair, thereby redelivering the request packet to each of the other memory devices. It is thus preferable to provide the memory device 21 with the phase adjustment function for adjusting the skew between the data pin of the memory device 21 and the data pin of the other memory devices. In this case, it should suffice if the phase adjustment is executed with respect to only the data pin that is used for the redelivery of the request packet.

(Function of RQ Reception-Side Memory Device)

The RQ reception-side memory devices (memory devices 22, 23 and 24) are provided with, for example, the following functions.

(5) A function of using a request packet, which is received with use of a remaining data pair, in place of a request packet which is received by the RQ[11:0].

(6) (Option) A function of adjusting the command execution start timing:

The reception-side memory device may immediately start the command execution, without waiting, in reply to the reception of the request packet. In this case, the timing adjustment function is not needed in the reception-side memory device.

(7) A register for controlling the setting of functions:

This register prestores control data for controlling the setting (enable/disable; designation of the data pin pair to be used for receiving redelivered information; designation of command execution start timing [designation of wait time]; etc.) of the various functions (function of receiving and processing redelivered information; timing adjustment function; etc.). The writing of control data to the register can be executed via a serial interface. The controller 11 or some other microcomputer can write control data to the register via the serial interface.

(8) (Option) A phase adjustment function such as Flex-Phase:

Normally, design is made to execute phase auto-adjustment with the controller. The reception-side memory device can also execute phase adjustment with the transmission-side memory device.

(Structure Example of RQ Transmission-Side Memory Device)

Figure 6:
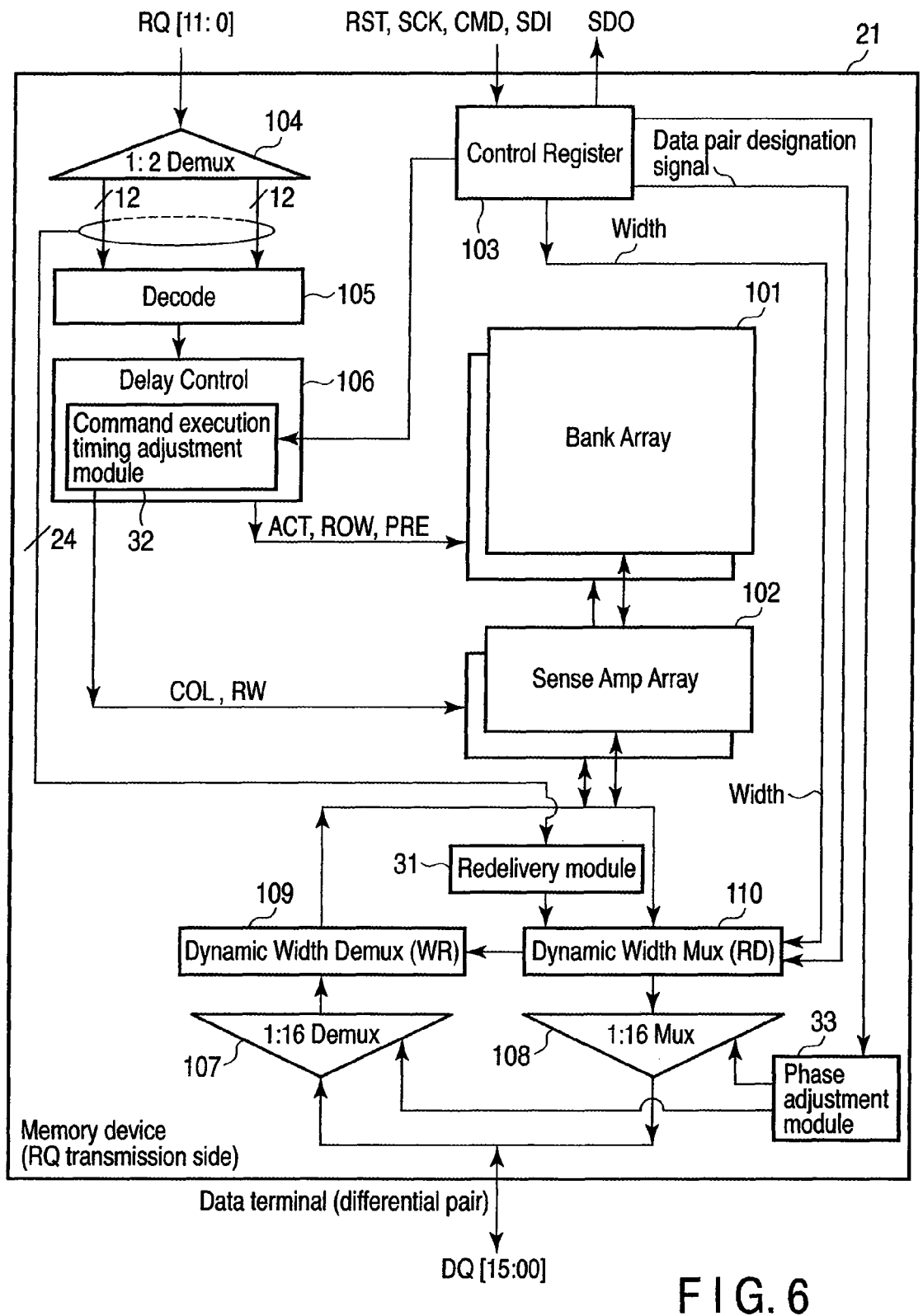
FIG. 6 is an exemplary block diagram showing a structure example of a memory device which functions as an RQ transmission-side memory device in the memory system according to the embodiment.

FIG. 6 shows a concrete structure example of the memory device 21 which functions as the RQ transmission side.

The memory device 21 includes 16-pair data pins DQ[15:00] which can execute data transfer; 12 RQ signal pins RQ[11:00] for receiving a request packet; a reset input pin RST; a serial clock input pin SCK; a command input pin CMD; a serial data input pin SDI; and a serial data output pin SDO.

The memory device 21 further includes a plurality of bank arrays 101, a plurality of sense amplifier arrays 102, a control register 103, a demultiplexer (1:2 DEMUX) 104, a decoder 105, a delay control module 106, a demultiplexer (1:16 DEMUX) 107, a multiplexer (1:16 MUX) 108, a data transfer width control module (Dynamic width Demux [WR]) 109, a data transfer width control module (Dynamic width Mux [RD]) 110, a redelivery module 31, a command execution timing adjustment module 32, and a phase adjustment module 33.

The plural bank arrays 101 and plural sense amplifier arrays 102 function as a memory core. The demultiplexer (1:2 DEMUX) 104 are connected to 12 RQ signal pins RQ[11:00]. The RQ signal pins RQ[11:00] receive the request packet. The demultiplexer (1:2 DEMUX) 104 receives 12-bit information at a rising edge and a falling edge of the clock signal, thereby outputting a 24-bit request packet. The 24-bit request packet is sent to the decoder 105 and to the redelivery module 31.

Each time the decoder 105 receives the 24-bit request packet (address or command), the decoder 105 decodes the request packet (address or command). In accordance with the decoded result, the decoder 105 outputs to the memory core the control signal (ACT, ROW, PRE, COL or R/W) for accessing the memory core. ACT is an active command for selecting a bank that is the object of access. ROW is a row address for selecting a page in the selected bank. The selected page is loaded in the sense amplifier array 102 corresponding to the selected bank. PRE is a precharge command for selecting the bank that is the object of precharge. COL is a column address which designates a column in the selected page. R/W is a command which designates read access/write access.

The control signal (ACT, ROW, PRE, COL or R/W) is sent to the memory core via the delay control module 106. The delay control module 106 is provided with the command execution timing adjustment module 32. The command execution timing adjustment module 32 reads the wait time which is set in the control register 103 by the controller 11, and delays, by the wait time, the timing of the output of the control signal to the memory unit. The wait time that is set in the control register 103 corresponds to the time that is needed for the redelivery of the request packet. Thereby, the start timing of the memory access operation, which is to be executed by the memory device 21, is delayed by the wait time. As a result, the memory access operation of the memory device 21 can be started in accordance with the start timing of the memory access operation of the reception-side memory device.

The demultiplexer (1:16 DEMUX) 107, multiplexer (1:16 MUX) 108, data transfer width control module (Dynamic width Demux [WR]) 109 and data transfer width control module (Dynamic width Mux [RD]) 110 function as data input/output modules, which execute reception of write data from the controller and transmission of read data to the controller via some selected pairs of the 16-pair data pins DQ[15:00].

In the write transaction, the DQ[15:00] can receive, for example, 16×16-bit write data at 16-clock cycles. The clock cycle, in this context, refers to a clock cycle corresponding to the data transfer rate (3.2, 4.0 or 4.8 GHz; in the future, 6.4 GHz is planned). Specifically, 16-bit write data per 16-clock cycle is received by each individual data pin pair which is used for data transfer. The demultiplexer (1:16 DEMUX) 107 receives 16-bit write data at each individual pin pair, and sends 16×16-bit write data to the data transfer width control module (Dynamic width Demux [WR]) 109.

In the read transaction, the DQ[15:00] can output, for example, 16×16-bit read data at 16-clock cycles. Specifically, 16-bit read data per 16-clock cycle is output from each individual data pin pair which is used for data transfer. The multiplexer (1:16 MUX) 108 can output 16-bit read data at each individual pin pair.

The data transfer width control module (Dynamic width Demux [WR]) 109 and data transfer width control module (Dynamic width Mux [RD]) 110 select, from the DQ[15:00] of the 16 pairs, the data pin pairs, which are connected to the controller, as the data pin pairs which are to be used for data transfer with the controller. Specifically, the data transfer width control module (Dynamic width Demux [WR]) 109 and data transfer width control module (Dynamic width Mux [RD]) 110 vary the number of data pins (the number of data pin pairs) which are to be used for data transfer with the controller, thereby setting the data transfer width at the ×16 mode, ×8 mode, ×4 mode, ×2 mode, or ×1 mode. The number of data pin pairs, which are to be used for data transfer, is controlled by the width information (Width) which is set in the control register 103.

In order to realize the above-described redelivery function, the data transfer width control module (Dynamic width Mux [RD]) 110 also has a function of selecting, as data pin pairs for use in redelivery of the request packet, each data pin pair which is designated by a data pair designation signal that is set in the control register 103.

The phase adjustment module 33 executes a phase adjustment process for adjusting the skew between the data pin of the memory device 21 and the data pin of each reception-side memory device.

(Structure Example of RQ Reception-Side Memory Device)

Figure 7:
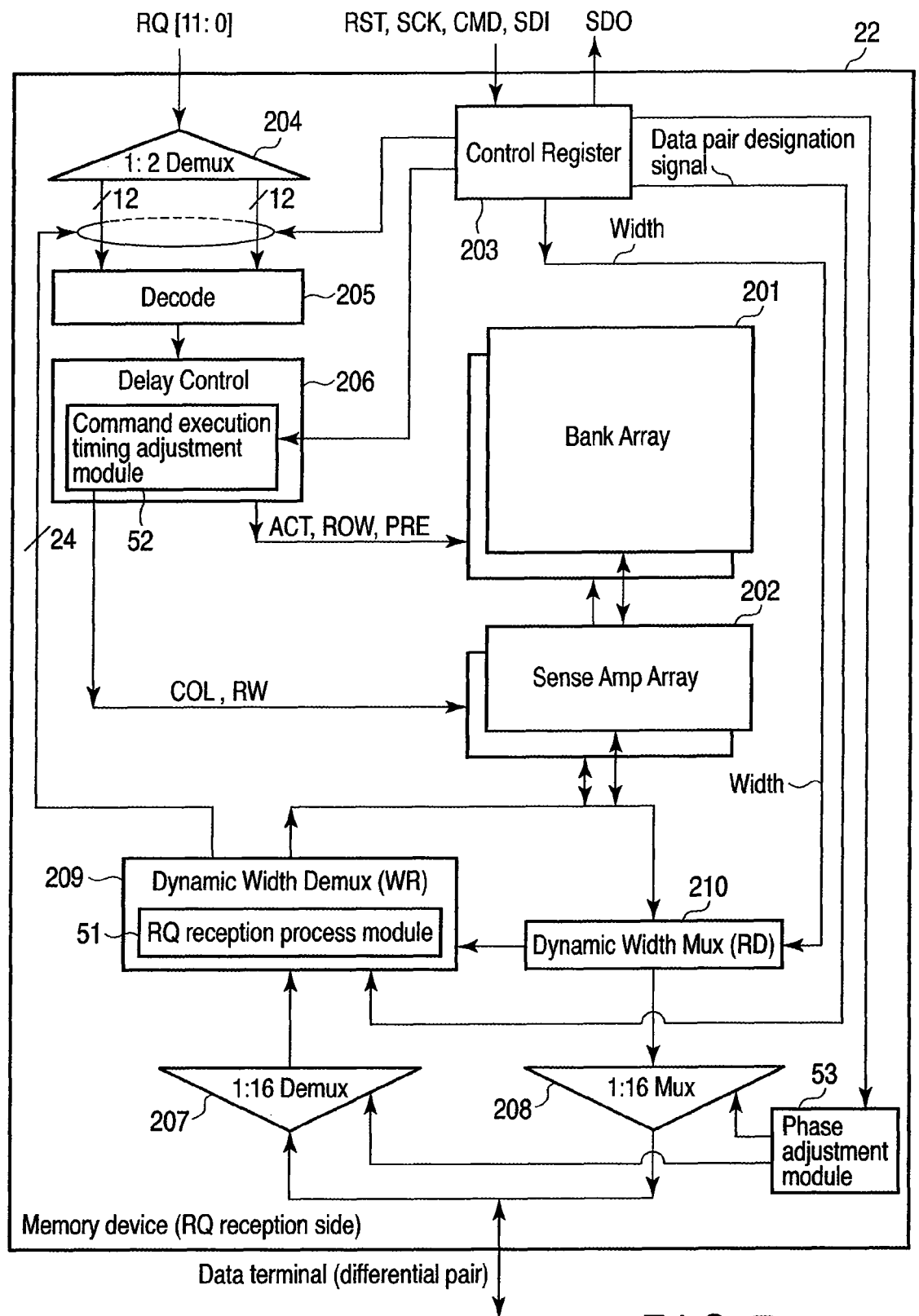
FIG. 7 is an exemplary block diagram showing a structure example of a memory device which functions as an RQ reception-side memory device in the memory system according to the embodiment.

FIG. 7 shows a concrete structure example of the memory device 22 which functions as the RQ reception side.

The memory device 22 includes 16-pair data pins DQ[15:00] which can execute data transfer; 12 RQ signal pins RQ[11:00] for receiving a request packet; a reset input pin RST; a serial clock input pin SCK; a command input pin CMD; a serial data input pin SDI; and a serial data output pin SDO.

A plurality of bank arrays 201 and a plurality of sense amplifier arrays 202 function as a memory core. In the reception-side memory device, a demultiplexer (1:2 DEMUX) 204 is not used. Instead, the 24-bit request packet (address or command), which is redelivered, is sent to a decoder 205. Control data, which is set in the control register 203, can execute control as to which of the 24-bit request packet, which is redelivered, and the output of the demultiplexer (1:2 DEMUX) 204 is to be supplied to the decoder 205.

Each time the decoder 205 receives the redelivered 24-bit request packet (address or command), the decoder 105 decodes the request packet (address or command). In accordance with the decoded result, the decoder 205 outputs to the memory core the control signal (ACT, ROW, PRE, COL or R/W) for accessing the memory core. The control signal (ACT, ROW, PRE, COL or R/W) is sent to the memory core via a delay control module 206. The delay control module 206 may be provided with a command execution timing adjustment module 52. The command execution timing adjustment module 52 reads the wait time which is set in the control register 203 by the controller 11, and delays, by the wait time, the timing of the output of the control signal to the memory unit.

A demultiplexer (1:16 DEMUX) 207, a multiplexer (1:16 MUX) 208, a data transfer width control module (Dynamic width Demux [WR]) 209 and a data transfer width control module (Dynamic width Mux [RD]) 210 function as data input/output modules, which execute reception of write data from the controller and transmission of read data to the controller via some selected pairs of the 16-pair data pins DQ[15:00].

The data transfer width control module (Dynamic width Demux [WR]) 209 and data transfer width control module (Dynamic width Mux [RD]) 210 select, from the DQ[15:00] of the 16 pairs, the data pin pairs, which are connected to the controller, as the data pin pairs which are to be used for data transfer with the controller. Specifically, the data transfer width control module (Dynamic width Demux [WR]) 209 and data transfer width control module (Dynamic width Mux [RD]) 210 vary the number of data pins (the number of data pin pairs) which are to be used for data transfer with the controller, thereby setting the data transfer width at the ×16 mode, ×8 mode, ×4 mode, ×2 mode, or ×1 mode. The number of data pin pairs, which are to be used for data transfer, is controlled by the width information (Width) which is set in the control register 203.

In addition, in order to realize the above-described redelivery function, the data transfer width control module (Dynamic width Demux [WR]) 209 also has a function of selecting, as data pin pairs for use in receiving the request packet, each data pin pair which is designated by a data pair designation signal that is set in the control register 203. An RQ reception process module 51 in the data transfer width control module (Dynamic width Demux [WR]) 209 supplies to the input of the decoder 205 the 24-bit request packet, which is received via the data pin pair that is designated by the data pair designation signal, in place of the output information of the demultiplexer (1:2 DEMUX) 204.

A phase adjustment module 53 executes phase adjustment with the transmission-side memory device.

Each of the other reception-side memory devices 23 and 24 has the same structure as the memory device 22.

Each of the memory devices may be provided with the function corresponding to the transmission-side memory device and the function corresponding to the reception-side memory device. In this case, the enable/disable of each function may be set according to whether each memory device is used as the transmission-side memory device or the reception-side memory device.

(Latency)

In the present embodiment, since the request packet is redelivered from one memory device to each of the other memory devices, it is possible that the latency increases. However, it is possible to earlier send the request packet on the controller side, in anticipation of the delay of the operation start timing due to the request packet redelivery on the memory device side. As regards some memory operations, the effect of the increase in latency can be reduced by the early sending of the request packet on the controller side.

(Register Setting)

In the memory system of the present embodiment, the controller presets, with respect to each memory device, whether the request packet is received directly from the RQ[11:0] or from another memory device by redelivery. This setting process is executed, for example, in the system initialization process.

(Hierarchization)

Use can be made of such configuration that a memory device, which has received a request packet from another memory device by redelivery, redelivers the request packet to still another memory device. In this case, in order to uniformize the operation start timing in the entire system, the controller may individually set the wait time in each memory device.

As has been described above, in the present embodiment, in the case of expanding the memory capacity by using the Dynamic Width Control function or the like, unused remaining data pins (differential pairs) are utilized to share the RQ packet information between the memory devices. Thereby, even if the number of memory devices increases, it is possible to secure the signal quality of the RQ and to realize the stable high-speed operation.

The memory device, to which the redelivery function of the present embodiment is applied, may be a memory device which is configured such that only some of plural data pins can be used for data transfer with the controller, and the other data pins can be used in transmission and reception for redelivery of an address and command. Thus, the redelivery function of the present embodiment is not limited to the XDR™ DRAM, and is applicable to a memory device of an arbitrary type, such as a DDR SDRAM, which is, for instance, a ×16-bit structure memory device, but is also usable as a ×8-bit structure memory device, with the other eight data pins being usable for transmission/reception of redelivery of the command and address.

The present embodiment is directed, by way of example, to the case in which each data pin is composed of a differential pair, but the embodiment is not limited to this case.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
    a first memory device including a plurality of first data pins and configured to receive write data from a controller and transmit read data to the controller via at least one of the plurality of first data pins, said at least one of the plurality of first data pins being point-to-point-connected to at least one data pin of the controller;
    a second memory device including a plurality of second data pins and configured to receive write data from the controller and transmit read data to the controller via at least one of the plurality of second data pins, said at least one of the plurality of second data pins being point-to-point-connected to at least another one data pin of the controller; and
    a redelivery module within the first memory device, configured to receive an address and a command from the controller via a predetermined signal line and to redeliver the received address and command to the second memory device via at least a remaining one of the plurality of first data pins.

2. The memory system of claim 1, wherein said at least remaining one of the plurality of first data pins is connected to at least a remaining one of the plurality of second data pins of the second memory device.

3. The memory system of claim 2, further comprising a third memory device including a plurality of third data pins and configured to receive write data from the controller and transmit read data to the controller via at least one of the plurality of third data pins, said at least one of the plurality of third data pins being point-to-point-connected to at least still another one data pin of the controller,
    wherein the redelivery module is configured to redeliver the received address and command to the second memory device via said at least remaining one of the plurality of first data pins and to redeliver the received address and command to the third memory device via at least another one of the plurality of first data pins, said at least another one of the plurality of first data pins being connected to at least a remaining one of the plurality of third data pins.

4. The memory system of claim 1, wherein the first memory device includes a first data transfer width control module configured to select said at least one of the plurality of first data pins as a data pin to be used for data transfer with the controller, in accordance with control information which is preset in a register in the first memory device.

5. The memory system of claim 4, wherein the second memory device includes a second data transfer width control module configured to select said at least one of the plurality of second data pins as a data pin to be used for data transfer with the controller, in accordance with control information which is preset in a register in the second memory device.

6. The memory system of claim 1, further comprising a timing adjustment module in the first memory device and configured to delay a start timing of a memory access operation, which is to be executed by the first memory device, by a predetermined wait time corresponding to a time which is needed for the redelivery of the address and command to the second memory device.

7. A memory device comprising:

a memory core;

a plurality of first data pins, each of which is configured to be capable of executing data transfer;

a data input/output module configured to receive write data from a controller and transmit read data to the controller via at least one of the plurality of first data pins;

at least one signal pin for receiving an address and a command which are transmitted from the controller via a predetermined signal line;

a decoder configured to decode the address and the command which are received via the at least one signal pin, and to output to the memory core a control signal for accessing the memory core; and a redelivery module configured to redeliver the received address and command to another memory device via at least a remaining one of the plurality of first data pins.

8. The memory device of claim 7, wherein said another memory device includes a plurality of second data pins, at least one of the plurality of second data pins is connected to the controller, and at least remaining one of the plurality of second data pins is connected to said at least remaining one of the plurality of first data pins in such a manner as to receive the address and command from the redelivery module.

9. The memory device of claim 7, further comprising a timing adjustment module configured to delay a timing of the output of the control signal to the memory core, by a predetermined wait time corresponding to a time which is needed for the redelivery of the address and command to said another memory device.

* * * * *